(12) United States Patent
Daley

(10) Patent No.: US 9,598,613 B2
(45) Date of Patent: Mar. 21, 2017

(54) COMPOSITE ADHESIVE TAPE

(71) Applicant: Shawn Bruce Joseph Daley, Scarborough (CA)

(72) Inventor: Shawn Bruce Joseph Daley, Scarborough (CA)

(*) Notice: Subject to any disclaimer, the term of this patent is extended or adjusted under 35 U.S.C. 154(b) by 62 days.

(21) Appl. No.: 14/373,549

(22) PCT Filed: Jan. 18, 2013

(86) PCT No.: PCT/CA2013/050036
§ 371 (c)(1),
(2) Date: Jul. 21, 2014

(87) PCT Pub. No.: WO2013/106939
PCT Pub. Date: Jul. 25, 2013

(65) Prior Publication Data
US 2015/0004346 A1    Jan. 1, 2015

Related U.S. Application Data

(60) Provisional application No. 61/589,017, filed on Jan. 20, 2012.

(51) Int. Cl.
*C09J 7/02* (2006.01)
*B32B 37/26* (2006.01)
(Continued)

(52) U.S. Cl.
CPC ............... *C09J 7/0285* (2013.01); *B32B 7/06* (2013.01); *B32B 37/26* (2013.01); *B32B 38/04* (2013.01); *C09J 7/02* (2013.01); *E04F 15/02155* (2013.01); *B32B 2037/268* (2013.01); *B32B 2038/045* (2013.01); *B32B 2307/304* (2013.01);
(Continued)

(58) Field of Classification Search
CPC  B32B 7/06; B32B 37/26; B32B 38/04; B32B 2471/00; B32B 2405/00; B32B 2383/00; B32B 2307/268; B32B 2307/304; B32B 2038/045; B32B 2367/00; C09J 7/02; C09J 7/0285; C09J 2467/006; E04F 15/02155; Y10T 156/1082; Y10T 156/10; Y10T 428/2804; Y10T 428/2852;
(Continued)

(56) References Cited

U.S. PATENT DOCUMENTS 1,322,257 A    11/1919   Miller
4,152,473 A     5/1979   Layman
(Continued)

OTHER PUBLICATIONS

International Search Report corresponding to International Application No. PCT/CA2013/050036 dated Apr. 8, 2013.

*Primary Examiner* — Patricia L Nordmeyer
(74) *Attorney, Agent, or Firm* — Jenkins, Wilson, Taylor & Hunt, P.A.

(57) ABSTRACT

The specification discloses a composite adhesive tape, containing a thermally reflective and insulative adhesive tape layer; and a rigid adhesive tape layer. Also disclosed is a method of manufacturing a composite adhesive tape, containing the step of laminating a thermally reflective and insulative tape layer with a rigid adhesive tape layer. Further disclosed is a method of applying a flooring material, containing the steps of placing the composite adhesive tape as described herein on a surface; and positioning the flooring material on the tape.

12 Claims, 2 Drawing Sheets

(51) Int. Cl.
*B32B 38/04* (2006.01)
*B32B 7/06* (2006.01)
*E04F 15/02* (2006.01)

(52) U.S. Cl.
CPC ....... *B32B 2367/00* (2013.01); *B32B 2383/00* (2013.01); *B32B 2405/00* (2013.01); *B32B 2471/00* (2013.01); *C09J 2467/006* (2013.01); *Y10T 156/10* (2015.01); *Y10T 156/1082* (2015.01); *Y10T 428/1476* (2015.01); *Y10T 428/24752* (2015.01); *Y10T 428/2804* (2015.01); *Y10T 428/2852* (2015.01)

(58) Field of Classification Search
CPC ....... Y10T 428/1476; Y10T 428/24752; Y10T 428/14; Y10T 428/1438; Y10T 428/1443
See application file for complete search history.

(56) References Cited

U.S. PATENT DOCUMENTS

| | | |
|---|---|---|
| 4,535,015 A | 8/1985 | Bruner et al. |
| 4,699,838 A * | 10/1987 | Gilbert .................. B32B 15/08 116/211 |
| 4,699,868 A | 10/1987 | Sabongi |
| 4,988,550 A * | 1/1991 | Keyser ................ B05B 15/0456 118/505 |
| 5,051,259 A | 9/1991 | Olsen et al. |
| 5,585,178 A | 12/1996 | Calhoun et al. |
| 5,589,027 A | 12/1996 | Thornton et al. |
| 5,593,771 A | 1/1997 | Lawless et al. |
| 5,691,051 A | 11/1997 | Matthews |
| 5,750,227 A | 5/1998 | Adams |
| 5,800,664 A | 9/1998 | Covert |
| 5,824,175 A | 10/1998 | Hoopengardner |
| 5,981,035 A | 11/1999 | Eshleman |
| 6,207,245 B1 * | 3/2001 | Miller ...................... B32B 7/06 156/247 |
| 6,335,091 B2 | 1/2002 | Nelson et al. |
| 6,694,682 B2 | 2/2004 | Fanti |
| 6,946,178 B2 | 9/2005 | Sheats et al. |
| 7,464,510 B2 | 12/2008 | Scott et al. |
| 7,721,502 B2 | 5/2010 | Scott et al. |
| 7,757,457 B2 | 7/2010 | Zah et al. |
| 7,799,165 B2 | 9/2010 | Brewer et al. |
| 8,220,221 B2 | 7/2012 | Gray et al. |
| 8,381,473 B2 | 2/2013 | Scott et al. |
| 8,434,282 B2 | 5/2013 | Scott et al. |
| 8,468,771 B2 | 6/2013 | Gray et al. |
| 8,468,772 B2 | 6/2013 | Oakey et al. |
| 2008/0233394 A1 | 9/2008 | Domanski et al. |
| 2009/0291279 A1 | 11/2009 | Schroeer et al. |
| 2010/0251641 A1 | 10/2010 | Gallagher et al. |
| 2011/0151249 A1 | 6/2011 | Yamanaka et al. |
| 2012/0148791 A1 | 6/2012 | Yamanaka et al. |
| 2013/0232900 A1 | 9/2013 | Scott et al. |
| 2013/0263553 A1 | 10/2013 | Scott et al. |

\* cited by examiner

COMPOSITE ADHESIVE TAPE

This application claims priority to and the benefit of U.S. Provisional Patent Application No. 61/589,017, filed on Jan. 20, 2012, the contents of which are incorporated herein by reference.

FIELD

The specification relates to a composite adhesive tape, a method of making the same and a method of using the same.

BACKGROUND

In applying flooring material, such as a vinyl flooring material, the substrate on to which the flooring material is applied can require preparation. For example, subfloors can be prepared by applying cement. Alternatively, flooring material can also be applied to existing floors. The process can involve application of an adhesive, such as glue, followed by placing the flooring material on the adhesive for obtaining the finished flooring.

In addition, the use of such adhesive in application of the flooring material can lead to volatile organic compounds (VOCs) that can be both detrimental to health and environment. Further, the adhesive can require significant time for application; and also after placing the flooring material on the adhesive, additional time can be required, for example, to allow aeration of the environment, prior to utilization of the flooring material.

Further to above, if the new flooring material is applied to a pre-existing flooring material, the use of the above-described procedure can lead to detrimental impact on the pre-existing flooring material, such that it may not be possible for it to be utilized again.

There is a need in the art for a material, such as an adhesive tape, that can be used for application of a flooring material, such as a vinyl flooring material, and that can help to address or mitigate some or all of the issues noted above. In addition, there is a need in the art for a method of application of an adhesive tape and a method of manufacture of the tape.

SUMMARY OF THE INVENTION

In one aspect, the specification relates to a composite adhesive tape, containing:
  a thermally reflective and insulative adhesive tape layer; and
  a rigid adhesive tape layer.

In another aspect, the specification discloses a method of manufacturing a composite adhesive tape, containing the step of laminating a thermally reflective and insulative tape layer with a rigid adhesive tape layer.

In a further aspect, the specification discloses a method of applying a flooring material, containing the steps of:
  placing the composite adhesive tape as described herein on a surface; and
  positioning the flooring material on the tape.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
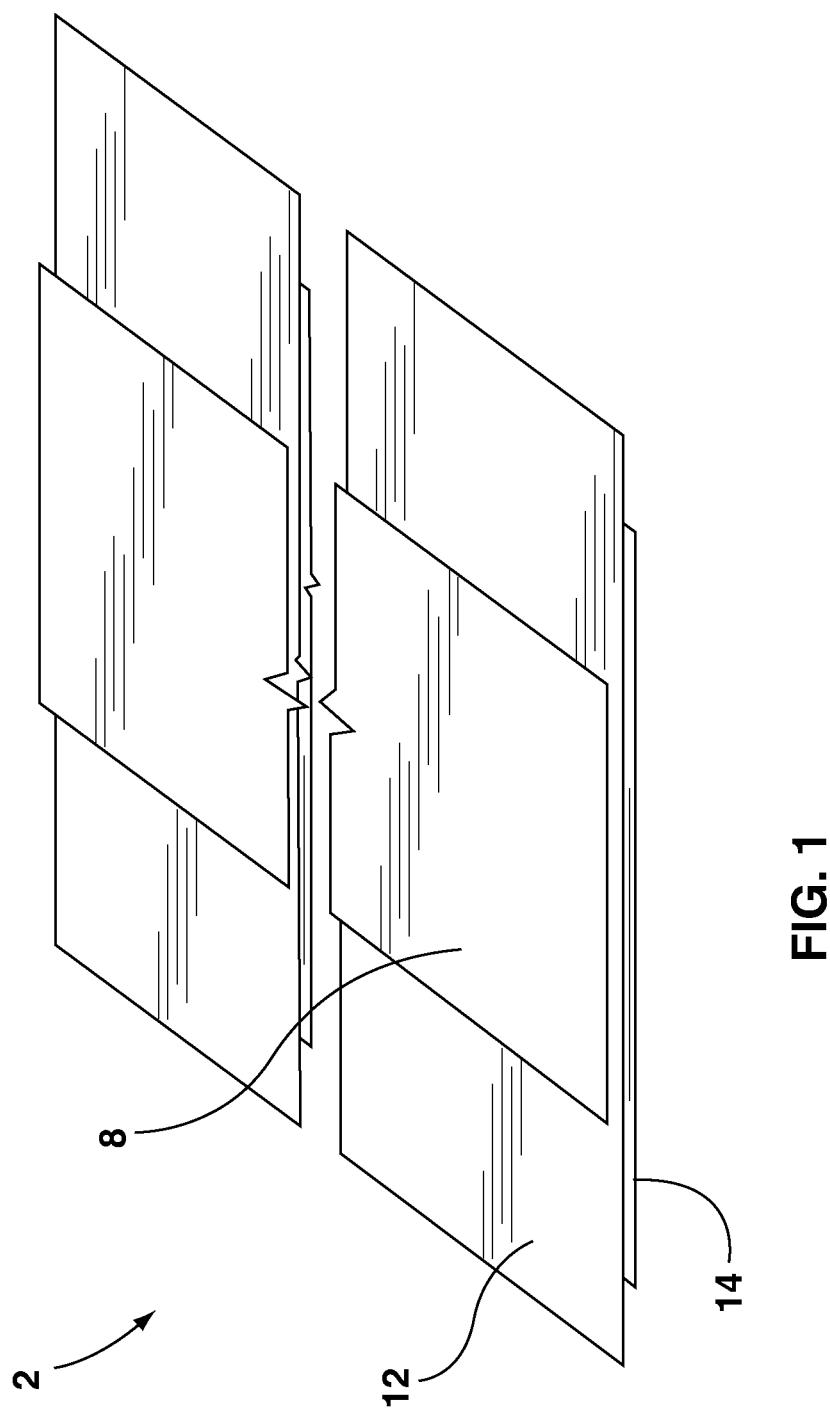
FIG. 1 shows an embodiment in accordance with one aspect of the specification.
Figure 2:
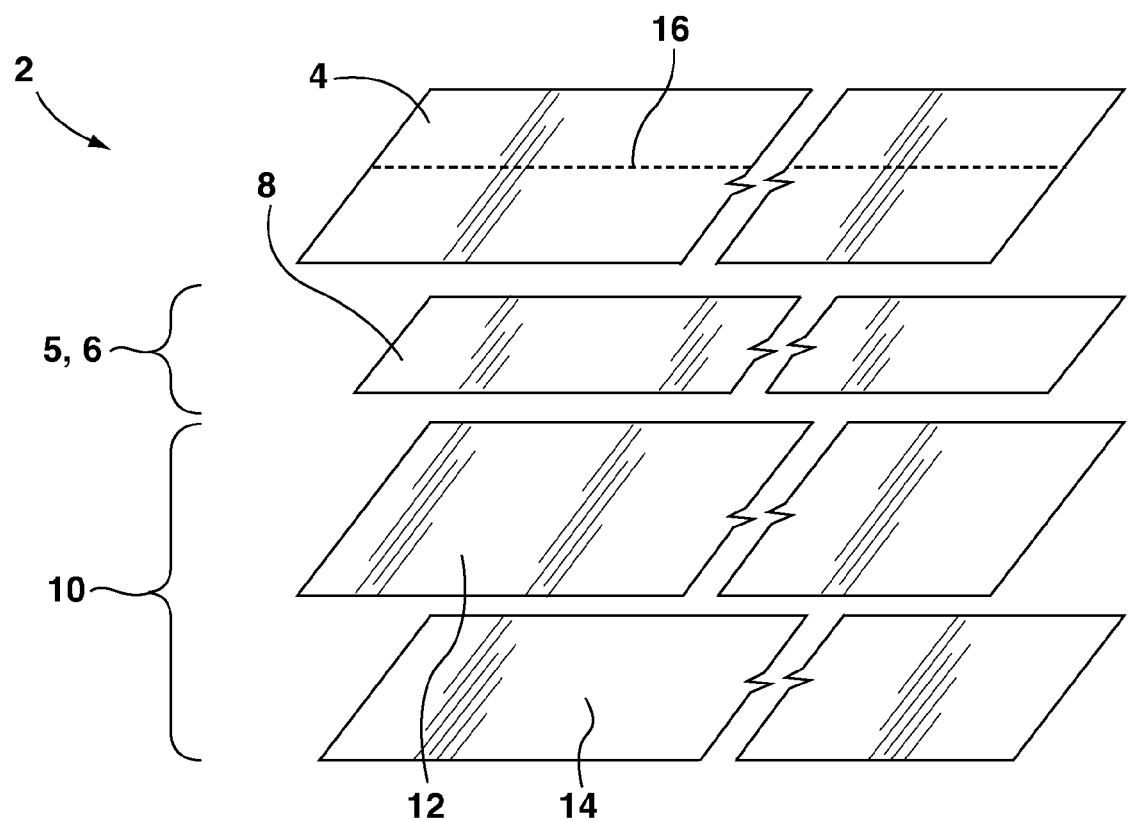
FIG. 2 shows a perspective view of another embodiment of the composite adhesive tape in accordance with the specification.
Figure 3:
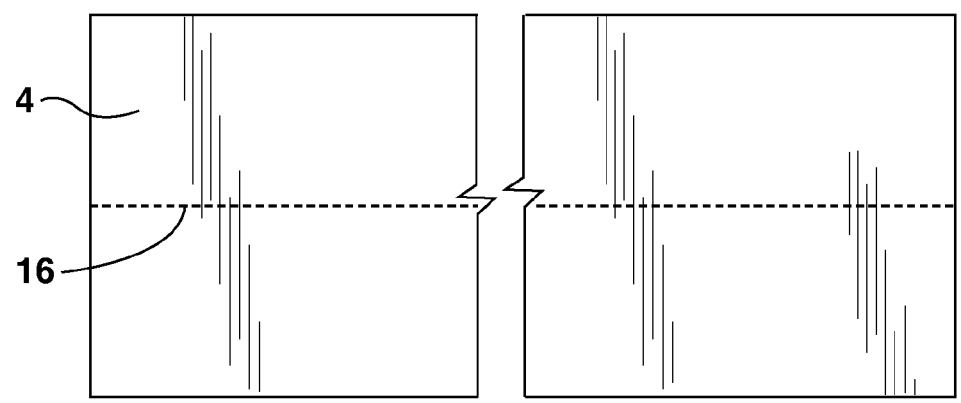
FIG. 3 shows a top view of a releasable liner that can be used in with an embodiment of a composite adhesive tape in accordance with the specification.

As described above, in one aspect the specification discloses a composite adhesive tape, containing:
  a thermally reflective and insulative adhesive tape layer; and
  a rigid adhesive tape layer.

The thermally reflective and insulative adhesive tape layer, in accordance with the specification, can be formed by one or more thermally reflective and insulative tapes. The thermally reflective and insulative adhesive tape in accordance with the specification is not particularly limited. In one embodiment, for example and without limitation, the thermally reflective and insulative tape layer is formed by a single thermally reflective and insulative tape. In a further embodiment, for example and without limitation, the thermally reflective and insulative tape layer is a heat resistant tape.

The thermally reflective and insulative tape layer is adapted to reflect and/or insulate the remaining parts of the composite tape from heat applied to the composite tape during use of the composite tape to hold down a flooring material and during the process of manufacturing the composite tape, disclosed herein. In addition, the properties of the thermally reflective and insulative tape forming the thermally reflective and insulative tape layer are such that the thermally reflective and insulative tape layer can avoid degradation and can retain its adhesive properties sufficiently for attaching a flooring material to the thermally reflective and insulative tape. Moreover, the thermally reflective and insulative tape layer is such that it can prevent degradation of the rigid adhesive tape layer from a heat source that is used for applying the flooring material to the composite tape.

In one embodiment in accordance with the specification, the tape used for forming the thermally reflective and insulative tape layer is formed by a carrier layer having an adhesive coated thereon. The carrier layer used for forming the thermally reflective and insulative tape is not particularly limited. The carrier is selected to provide the required thermal reflective and insulative properties; which can depend upon the particular product requirements. In a particular embodiment, for example and without limitation, the carrier of the thermally reflective and insulative tape is formed by an aluminum foil having a glass cloth thereon.

The thickness of the carrier used for forming the thermally reflective and insulative tape is also not particularly limited and can depend upon the particular product requirements. In general, the thickness of the carrier layer used for forming the thermally reflective and insulative tape is selected to avoid significantly increasing the overall thickness of the composite tape, which can lead to telegraphing, as described further herein. In one embodiment, for example and without limitation, the thickness of the carrier used for forming the thermally reflective and insulative tape is from about 2 mil to about 8 mil. In a further embodiment, for example and without limitation, the thickness of the carrier used for forming the thermally reflective and insulative tape is about 5 mil (0.127 mm).

The adhesive on the carrier used for forming the thermally reflective and insulative tape is also not particularly limited and can depend upon the particular product requirements. In general, the adhesive is selected to withstand the temperature encountered by the thermally reflective and insulative tape, without significantly deteriorating or loosing its adhesive ability to hold a flooring material during application. In a particular embodiment, for example and without limitation, the adhesive applied on the carrier used for forming the thermally reflective and insulative tape is silicone, a silicone-based adhesive, acrylic adhesive or an acrylic-based adhesive. In a further particular embodiment, for example and without limitation, the adhesive applied is silicone.

The thickness of the adhesive, applied on the carrier used for forming the thermally reflective and insulative tape is also not particularly limited and can depend upon the particular product requirements. In general, the thickness of the adhesive is selected to avoid significantly increasing the overall thickness of the composite tape. In one embodiment, for example and without limitation, the thickness of the adhesive is from about 1 mil to about 4 mil. In a further embodiment, for example and without limitation, the thickness of the adhesive is about 2.5 mil (0.063 mm).

The adhesiveness of the adhesive applied on the carrier used for forming the thermally reflective and insulative layer is not particularly limited, so long as it can sufficiently adhere and hold flooring material for an extended period of time. In one embodiment, for example and without limitation, the 180° peel adhesion to stainless steel of the adhesive used on the carrier is from about 30 to about 50 oz/in. In a particular embodiment, for example and without limitation, the 180° peel adhesion to stainless steel of the adhesive used on the carrier is about 38 oz/in (10.8 N/25 mm).

The thickness of the thermally reflective and insulative tape used for forming the thermally reflective and insulative layer is not particularly limited. In general, however, it is selected to avoid significantly contributing to the overall thickness of the composite tape while maintaining its desired function of thermal insulation. In one embodiment, for example and without limitation, the thermally reflective and insulative tape has a thickness from about 5.5 to about 9.5 mil. In a particular embodiment, for example and without limitation, the thermally reflective and insulative tape has a thickness of about 7.5 mil (0.191 mm).

The thermally reflective and insulative tape is generally selected to have a long holding power, so that it can remain attached to the material it is applied to. Consequently, tapes having longer holding powers are preferred. In one embodiment, for example and without limitation, the thermally reflective and insulative tape has a holding power of >100 hrs.

The width of the thermally reflective and insulative tape is also not particularly limited and can depend upon the particular product requirements. In one embodiment, for example and without limitation, the thermally reflective and insulative tape has a width from about 3" to about 8". In a particular embodiment, for example and without limitation, the thermally reflective and insulative tape has a width of about 5.5".

In a further embodiment in accordance with the specification, the thermally reflective and insulative tape as used and present in the composite tape is also moisture resistant, such that it can prevent ingress of moisture from above the flooring material towards the remaining portion of the composite tape.

The rigid adhesive tape layer, in accordance with the specification, is not particularly limited and can be formed by one or more rigid adhesive tapes. Further, the rigid adhesive tape used in forming the rigid adhesive tape layer, in accordance with the specification, is not particularly limited. In one embodiment, for example and without limitation, the rigid tape layer is formed by two rigid adhesive tapes.

The rigid tape layer is adapted to provide rigidity and strength to the overall composite tape. The rigidity of the one or more rigid tapes used for forming the rigid layer is not particularly limited and is selected to retain the overall shape of the composite tape and prevent it from bending during application. When the edge of a flooring material, such as a vinyl flooring material, is positioned on a tape, it can bend or cup due to the memory of the flooring material (which are typically supplied in rolls). In accordance with the specification, the rigidity of the rigid layer is selected to prevent or reduce such cupping.

In one embodiment in accordance with the specification, the tape used for forming the rigid tape layer is formed by a carrier layer having an adhesive coated thereon. As in the thermally reflective and insulative tape, the adhesive can be present on one side of the carrier. However, in another embodiment, and depending upon the application requirements, the adhesive can be present on both sides of the carrier.

The carrier layer used for forming the rigid tape is not particularly limited. The carrier is selected to provide the required rigidity as described above; and which can depend upon the particular product requirements. In a particular embodiment, for example and without limitation, the carrier of the rigid tape is formed of polyester (PET). In a further embodiment, for example and without limitation, the polyester used is stable at high temperature. For example, the polyester used for forming the carrier layer can be stable at a temperature range from about −57° C. to about 266° C.

The thickness of the carrier used for forming the rigid tape is not particularly limited and can depend upon the particular product requirements. In general, the thickness of the carrier used for forming the rigid tape is selected to avoid significantly increasing the overall thickness of the composite tape. As mentioned above, excessive thickness of the composite tape can lead to telegraphing of the flooring material, which can be undesirable. In one embodiment, for example and without limitation, the thickness of the carrier used for forming the rigid tape is from about 2 mil to about 15 mil. In a further embodiment, for example and without limitation, the thickness of the carrier used for forming the rigid tape is about 2.5 mil (0.063 mm).

The adhesive on the carrier used for forming the rigid tape is also not particularly limited and can depend upon the particular product requirements. In one embodiment, for example and without limitation, the adhesive can be the same or different from the adhesive applied on the carrier used for forming the thermally reflective and insulative tape. In a particular embodiment, for example and without limitation, the adhesive applied on the carrier used for forming the rigid tape is the same as the adhesive applied on the thermally reflective and insulative tape, and is silicone or a silicone-based adhesive.

The thickness and adhesiveness of the adhesive, applied on the carrier used for forming the rigid tape is also not particularly limited and can depend upon the particular product requirements. In addition, the thickness and adhesiveness of the adhesive can be similar to the thickness and adhesiveness of the adhesive applied to the thermally reflective and insulative tape. In one embodiment, for example and without limitation, the thickness of the adhesive is from about 1 mil to about 4 mil. In a further embodiment, for example and without limitation, the thickness of the adhesive is about 1.5 mil (0.038 mm). In a still further embodiment, for example and without limitation, the 180° peel adhesion to stainless steel of the adhesive used on the carrier is from about 30 to about 50 oz/in. In a particular embodiment, for example and without limitation, the 180° peel adhesion to stainless steel of the adhesive used on the carrier is about 35 oz/in (10.0 N/25 mm).

The thickness of the rigid tape used for forming the rigid layer is also not particularly limited. In general, however, it is selected to avoid significantly contributing to the overall thickness of the composite tape while maintaining its desired function. In one embodiment, for example and without limitation, the rigid tape has a thickness from about 4 to about 9.5 mil. In a particular embodiment, for example and without limitation, the rigid tape has a thickness of about 6.5 mil (0.165 mm).

In a further embodiment in accordance with the specification, if multiple rigid tapes are used for forming the rigid adhesive tape layer, the thickness of the rigid adhesive tape layer is based on the thickness of each rigid tape used for forming the rigid adhesive tape layer. In a particular embodiment, where two rigid tapes are used for forming the rigid adhesive tape layer, the thickness of the rigid adhesive tape layer is about 13 mil (0.133 mm).

The width of the rigid tape is also not particularly limited and can depend upon the particular product requirements. In one embodiment, for example and without limitation, the rigid tape has a width from about 5" to about 10". In general, however, the rigid tape is wider than the thermally reflective and insulative tape, and which can help to prevent bending of the composite tape. In a particular embodiment, for example and without limitation, the rigid tape layer is formed by a combination of two rigid tapes, each of which has a different width, and both having a width greater than the width of the thermally reflective and insulative tape. For example, one of rigid tapes has a width of about 6.5", while the second rigid tape has a width of about 7.5". Such an embodiment can provide a composite adhesive tape that has a tapering profile, where the edge of the composite adhesive tape is thinner than the centre. Such a profile can help address the telegraphing effect encountered.

The composite tape as disclosed herein can be used at every welded seam of a flooring material and at the perimeter of the surface, such as a floor. The tape can serve multiple purposes, including:
 holding the two edges of the flooring material together during the welding process,
 the tape can protect the subfloor underneath the flooring material from the heat of the welding, and
 the tape can help prevent cupping and holds the flooring flat.

The composite tape will now be described with respect to the accompanying figures. In one embodiment in accordance with the specification, the composite adhesive tape (2) can be composed of three layers plus a removable liner (4). The layers are described in order from the "Top"—the side that adheres directly to the bottom of the flooring material—down to the "Bottom"—the side that lays flat on the subfloor (and is furthest from the flooring material).

The top layer (5) forms a thermally reflective and insulative layer (6), and in one embodiment, is formed by the thermally reflective and insulative tape (8). As example of the thermally reflective and insulative tape (8) is a Champion Tape S1450, which serves primarily to reflect weld heat away from the rest of the tape assembly and the subfloor. In a further embodiment, the top layer (5) is 5.25" (133 mm) wide and the total thickness of the layer is 7.5 mil (0.191 mm). It is composed of a 5 mil layer of tightly-woven fiberglass with a layer of aluminum foil, plus 2.5 mil (0.063 mm) of high-temperature silicone adhesive. The adhesive faces up, so that it grabs the bottom of the flooring material.

In the embodiment disclosed in the figures, the rigid adhesive layer (10) is formed by combination of the middle (12) and the bottom layers (14). The middle (12) and the bottom (14) layers together providing the desired rigidity of the composite adhesive tape (2).

The middle layer (12), in one embodiment, is a rigid tape which can be, for example and without limitation, a Champion Tape S1350. The middle layer (12) can serve to hold together the flooring material during welding and to hold the material flat (preventing cupping). In a further embodiment, the middle layer (12) is 6" (152 mm) wide and the total thickness of the layer is 6.5 (0.165 mm). It is composed of 5 mils (0.127 mm) of pure polyester film plus 1.5 mil (0.038 mm) high-temperature silicone adhesive (polyester is often referred to by the brand name "Mylar"). The adhesive layer faces up, so it grabs the top layer (5) as well as the bottom of the flooring material.

The bottom layer (14), in one embodiment, is also a rigid tape, which can be, for example and without limitation, a Champion Tape S1350. The bottom layer (14) serves primarily to hold the material flat (preventing cupping). In a further embodiment, it is 7.5" (190 mm) wide and the total thickness of the layer is 6.5 (0.165 mm). It is composed of 5 mils (0.127 mm) of pure polyester film plus 1.5 mil (0.038 mm) high-temperature silicone adhesive (polyester is often referred to by the brand name "Mylar"). The adhesive layer faces up, so it grabs the top layer (5), the middle layer (12) as well as the bottom of the flooring material.

In an alternative and preferred embodiment as disclosed in FIG. 1, the middle layer (12) and the bottom layer (14) are switched. With a wider middle layer (12) and a narrower bottom layer (14), the composite tape (2) adopts a tapering profile that thickens in going from the edge to middle of the rigid adhesive layer (10). Alternatively, a single layer having such a profile and the required rigidity can be used. With the use of such a tape having the profile described herein, telegraphing (bending) of flooring material placed on the adhesive tape can be significantly reduced or eliminated.

In a further embodiment, the composite adhesive tape (2) can be provided with a releasable layer (4), which covers the adhesive side of the entire laminated tape assembly. The type of releasable layer (4) is not particularly limited. In one embodiment, it may be composed of a textured polyethylene film or a specially-treated smooth polyester film. In either case, the releasable layer (4) does not adhere tightly to the tape assembly and is removed at the point of use. In a further embodiment, the releasable layer (4) is Champion Tape S1390. In a still further embodiment, the releasable layer (4) can have a slit down the center (16) so that one half is removed at a time; as it is applied first to one piece of flooring and then to the other.

In another aspect, the specification discloses a method of manufacturing a composite adhesive tape, containing the step of laminating a thermally reflective and insulative adhesive layer (6) with a rigid adhesive layer (10). The method of lamination is not particularly limited and can depend upon the particular tapes used for forming the thermally reflective and insulative adhesive layer (6) and the rigid adhesive layer (10).

In one embodiment in accordance with specification, the composite adhesive tape (2) can be manufactured in steps. First, the three different layers (and the release layer) are cut to the proper width. Then the top two layers are laminated together under pressure. Then the bottom layer (14) is laminated to the top two layers, also under pressure. Finally the releasable liner (4) is laminated to the composite adhesive tape (2) under reduced pressure; at the same time, it is scored to create the slit down the center (16).

The composite adhesive tape (2) in accordance with one embodiment of the specification has been engineered to help with alleviating the glue down method on most commercial flooring goods. For years all commercial floors had to be glued down directly to an existing or new substrate. The composite adhesive tape (2) in accordance with specification can be used as an alternative installation procedure over any existing substrate, and can help with alleviating the necessity to prepare sub floors with cement and can completely eliminate adhesives. Moreover, it provides a non-permanent option of holding down a flooring material, allowing the flooring material to be replaced or repaired, when desired.

Some of the advantages that can be availed by using the adhesive tape, in accordance with the specification, over the traditional installation procedure with adhesives, can include: alleviation of floor preparation, elimination of traditional adhesives, such as glues, therefore reducing costs and VOC's, eliminate existing floor removal, reduce use of bonding agents, eliminate aeration, reduce installation time, flooring material can be welded same day, water resistance, can save old floor underneath, and can be installed over an extreme high moisture substrate up to 90% (current limit is about 15% moisture).

Certain adaptations and modifications of the described embodiments can be made. Therefore, the above discussed embodiments are considered to be illustrative and not restrictive.

What is claimed is:

1. A composite adhesive tape, comprising:
    a thermally reflective and insulative adhesive tape layer; and
    a rigid adhesive tape layer comprising a first adhesive tape layer and a second adhesive tape layer, wherein:
    the first adhesive tape layer is sandwiched between the second adhesive tape layer and the thermally reflective and insulative tape layer;
    the first adhesive tape layer is wider than the second adhesive tape layer and the thermally reflective and insulative tape layer; and
    the thermally reflective and insulative tape layer is narrower than the first adhesive tape layer and the second adhesive tape layer.

2. The composite adhesive tape according to claim 1, wherein the thermally reflective and insulative adhesive tape layer comprises a thermally reflective and insulative carrier having an adhesive thereon.

3. The composite adhesive tape according to claim 1, wherein the rigid adhesive tape layer comprises a rigid carrier having an adhesive thereon.

4. The composite adhesive tape according to claim 1, wherein the composite adhesive tape is formed for positioning the thermally reflective and insulative tape layer between the rigid adhesive tape layer and a flooring material.

5. The composite adhesive tape according to claim 1, wherein the thermally reflective and insulative tape layer is moisture resistant.

6. The composite adhesive tape according to claim 1, wherein the thermally reflective and insulative tape layer comprises fiberglass laminated on an aluminum foil and silicone adhesive.

7. The composite adhesive tape according to claim 1, wherein the rigid adhesive tape layer comprises a polyester polymer, polyethylene, or polyvinyl chloride, and a silicone adhesive.

8. The composite adhesive tape according to claim 1, wherein the adhesive is present only on surfaces of the thermally reflective and insulative tape layer and the rigid adhesive tape layer adapted for contacting the flooring material.

9. The composite adhesive tape according to claim 1, wherein the tape further comprises a releasable liner.

10. The composite adhesive tape according to claim 9, wherein the releasable liner has a slit along the length of the releasable liner.

11. The composite adhesive tape according to claim 10, wherein the slit is present about the centre of the releasable liner or the composite adhesive tape.

12. A method of applying a flooring material, comprising:
    placing the composite adhesive tape as defined in claim 1 on a surface; and
    positioning the flooring material on the tape.

* * * * *